Feb. 18, 1941.   S. C. E. SCHRØDER   2,232,481
MACHINE FOR SPREADING OF ARTIFICIAL FERTILIZERS
Filed Feb. 3, 1939   2 Sheets-Sheet 1

INVENTOR
S. C. E. SCHRODER
BY
Young, Emery & Thompson
ATTYS.

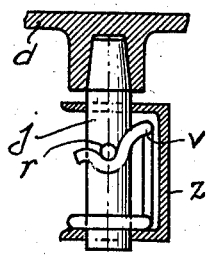
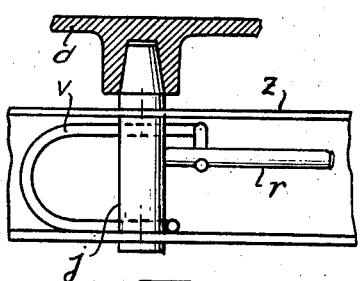
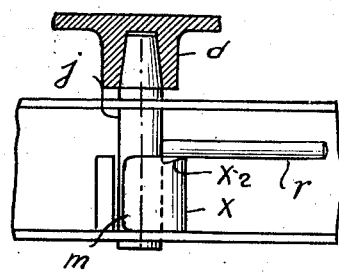
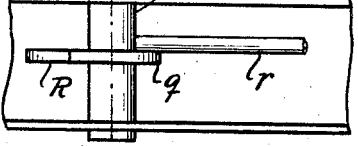
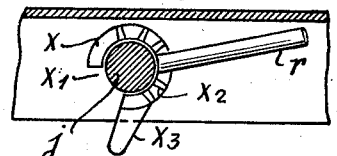
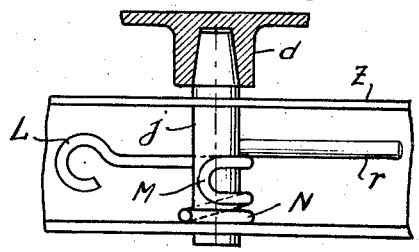
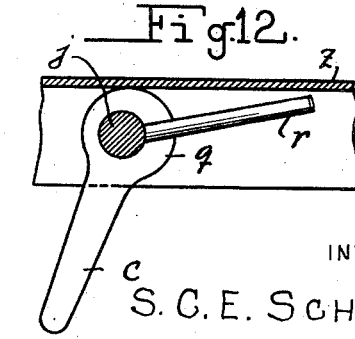

Patented Feb. 18, 1941

2,232,481

UNITED STATES PATENT OFFICE 2,232,481

MACHINE FOR SPREADING OF ARTIFICIAL FERTILIZERS

Svend Christian Emil Schrøder, Skive, Denmark, assignor to Diderik Overgaard Villemoes, Villemoesgaard, Denmark, and A/S Gyro Skive Jernstøberi & Maskinfabrik, Skive, Denmark, a stockholder company of Denmark Application February 3, 1939, Serial No. 254,501
In Denmark February 18, 1938

7 Claims. (Cl. 275—2)

The present invention relates to a machine for spreading artificial fertilizers by means of one or more rotary disc-shaped or cup-shaped discharge members disposed below openings in the bottom of a box, and arranged to convey the fertilizing substance received in the said box onto spreaders journalled on the rear wall of the said box so as to cause the said substance to be spread by the said spreaders, when rotated. More especially, the invention relates to machines of the kind referred to, in which the discharge members are mounted on the upper ends of vertical pivots or supporting pins and are driven by way of a driving shaft journalled transversely to the machine and coupled to the supporting wheels of the machine.

Machines of the kind referred to suffer from the drawback that the members serving to couple the said driving shafts will often be exposed to very high mechanical stresses when the machine is put into use after having stood idle for some time, during the course of which the fertilizer resting on the discharge members may have cemented the latter, or some of the latter, to the bottom of said box. This cementing together may be so prominent that it either entirely prevents the discharge members from being set into motion or requires very troublesome labor in dismounting, the discharge members being attached to the supporting pins so that they cannot be removed from the machine without the necessity of dismounting other parts also of the latter. In order to avoid this, the persons using the machine would often prefer to start it with great power, hoping to break down the cementing at the start. However, facts have proved that ordinarily the driving means or the coupling means of the machines, instead of the cementing, are broken down when doing so.

One object of the invention is to remedy this drawback, to which end each of the discharge members is loosely journalled on the upper end of the vertical pin supporting the member and the said pins are each arranged to be lowered separately relatively to the discharge member so as to be removed from the said member, which thereafter may be dismounted from the machine simply by being displaced transversely of the supporting pin. It thereby becomes feasible, without any great waste of time or trouble, to remove any discharge member that might become cemented by the fertilizer and to clean and thereafter remount the discharge member on the supporting pin. This arrangement would cause the persons using the machine to be less tempted to try to burst the cementing by starting the machine with great power.

To each of the supporting pins there is preferably attached an arm by means of which the supporting pin, which does not partake in the rotary motion of the discharge member loosely journalled thereon, can be rotated about its axis, from a position in which the arm is supported by a supporting member attached to the machine frame and to a position in which the arm can be lowered relatively to the discharging member, so that the latter can be removed from the machine.

Fig. 5 is a view in side elevation of a supporting pin and a modification of the means to maintain the pin in operative position.

Fig. 6 is a rear elevation of said pin.

Fig. 7 is a plan view of said pin.

Figs. 8 and 9 show, in rear elevation and plan, a supporting pin and another modification of said maintaining means.

Fig. 10 shows still another modification of the means.

Figs. 11 and 12 show, in rear elevation and plan, a form of maintaining means employing an eccentric disc portion.

In Figs. 1 to 4, $a$ is the sowing box and $b$ the supporting wheels of a machine for spreading of artificial fertilizers by means of several cup-shaped discharge members $d$ disposed below openings $e$ in the bottom of the sowing box, which members are driven each by a corresponding worm pinion $k$ on a horizontal driving shaft $l$. These pinions engage toothed rims $u$ on the discharge bodies, and their driving shaft $l$ is disposed below the sowing box and is coupled to the supporting wheels $b$ and $b_1$, Fig. 4, of the machine by means of gear drives $f$, $n$, Fig. 1.

The discharge members project rearward, behind the rear side of the sowing box, and are supported each by a corresponding vertical supporting pin $j$. All of the supporting pins are journalled on a supporting beam $z$ extending below the discharge members and connected to the end-walls $w$ on the relatively long sowing box $a$, the said beam $z$ acts as a tie rod between the end walls and counteracts the deflection of the central part of the box $a$ in such a manner that this deflection cannot be so great that the discharge members below the central part of the box $a$ may become pinched between the latter and the supporting beam.

Figure 2:
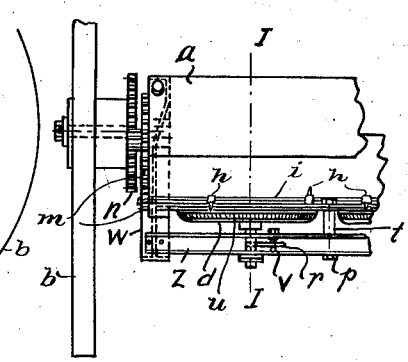
Fig. 2 is a fragmentary rear elevational view of the device of Fig. 1.

The supporting beam may preferably be connected to the bottom of the box $a$ by means of vertical bolts $p$, Fig. 2, with tubular spacing blocks $t$ disposed thereon at each interval between two adjacent discharge members $d$, in such a manner that the box $a$ together with the supporting beam $z$ will form a stiff unit adapted to resist vertical loads. On the other hand, the supporting beam should preferably only be braced horizontally at the ends and at the centre, relatively to the box $a$. The reason for this is that thereby the advantage is attained that if the resistance against the rotation of the discharge members for some reason, for instance due to an accumulation of cemented fertilizer between the edges of the discharge bodies and the box bottom, might become too great, then the pressure exerted on the discharge members by the worms $k$ will cause a slight horizontal displacement of the supporting beam, and thereby of the discharge members, relatively to the box, so that the said cementing together will be counteracted or annihilated.

Behind the rear wall of the sowing box, spreaders $h$ are provided on a horizontal shaft $i$ extending transversely to the machine, and this shaft is coupled to the supporting wheels by means of gear drives $m$, $n$. The said spreaders serve in known manner to spread over the field the fertilizer extracted from the box by the discharge members.

Figure 3:
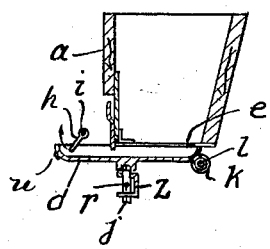
Fig. 3 is a vertical sectional view along line I—I of Fig. 2.
Figure 4:
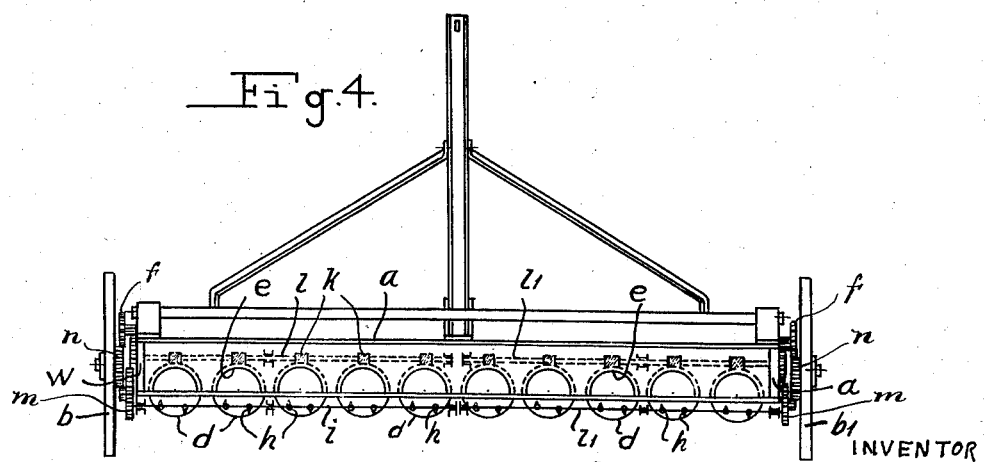
Fig. 4 is a diagrammatic plan view of the machine.

The shafts $l$ and $i$ do not run undivided through the entire width of the machine but, as shown in Fig. 3, they are each divided at the centre into two parts $l$, $l_1$ and $i$, $i_1$, situated end to end. The supporting wheels $b$ and $b_1$ situated on opposite sides of the machine are each coupled to both the shaft parts $l$ and $i$ or $l_1$ and $i_1$, situated nearest thereto, as shown in Fig. 4.

Figs. 5 to 12 show various constructions of the means serving to fix the supporting pins $j$ in the supporting beam.

Figure 1:
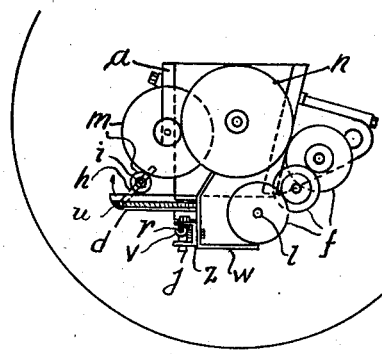
Figure 1 shows, in side elevation, a portion of a machine for spreading of artificial fertilizers, wheels and gearing being shown diagrammatically.

The supporting pins $j$ are each inserted in a hole in the supporting beam $z$ which in the constructions shown has a U-shaped cross-section, and the pins are maintained in the raised position shown in Figs. 1 to 3, in which the upper conical end of the supporting pin is inserted into the hub of the corresponding discharge body by means of an arm $r$, which is attached in the supporting pin and, in the construction shown in Figs. 1 to 3, rests in a bent rod $v$, one end of which is attached to the supporting beam $z$, while the other end forms a hook against which the arm $r$, when introduced into the said hook by an axial rotation of the pin $j$, will rest with a pressure sufficient to prevent the arm $r$ and, thereby, the supporting pin $j$ from rotating about the pin axis. If the arm $r$ is swung by hand about the axis of the pin $j$, away from the position shown in Figs. 1 and 2, whereby it is removed from the bent rod $v$, then the arm $r$ and consequently the supporting pin $j$ can be lowered, so that the pin is removed from the discharge member, which latter then can be removed in a direction at right angles to the supporting pin.

In the construction shown in Figs. 5 to 7 of the means serving to adjust and fix the supporting pins the bent member $v$ consists mainly of a U-shaped spring inserted in the U-shaped supporting beam $z$, in such a manner that one end of the spring rests against the bottom part of the supporting beam and partly encircles the supporting pin $j$. The other part of the spring $v$ is bent so as to form a hook in which the arm $r$ is resting.

In the construction shown in Figs. 8 and 9, the arm $r$ is supported on the top face of a sleeve $x$ encircling the supporting pin $j$ and having an axial slit $x_1$ of such a width that the arm $r$, when swung into a position above the slit $x_1$, can slide down through the latter, so that thereby the pin $j$ will be lowered. The top edge of the sleeve may be fitted with incisions $x_2$ serving to fix the position of the arm $r$ resting on this edge. The sleeve $x$ may be fitted with an adjusting lever $x_3$ by means of which it can be rotated about its axis.

In the construction shown in Fig. 10, the arm $r$ is supported by a helical spring N which encircles the supporting pin $j$. The top end of the helical spring N has a return bend M, so that the upper part of the spring encircles a portion of the periphery of the supporting pin in a direction opposite to the other windings of the spring, so as to form, along the periphery of the supporting pin, a loop on which the arm $r$ is resting. The spring terminates in an eyelet L by means of which it can be retained in position when the arm $r$ and, consequently, the pin $j$ are rotated.

It is seen directly that the pin $j$ will be adapted to be lowered when the arm $r$ is swung into a position in which it can move down, past the return bend M.

In the construction shown in Figs. 11 and 12, the pin $j$ is fitted with an eccentric disc $q$ which is integral with an arm $c$ serving to effect the rotation of the disc. By a rotation of the eccentric disc $q$ the periphery thereof can be moved towards the supporting beam $z$, and thereby the disc will exert a lateral pressure against the supporting pin so as to fix the same in the holes provided for the pin in the supporting beam $z$. In this construction the arm $r$ serves merely to lift the pin $j$ from the lowered position into which it will sink when the eccentric disc $q$ is rotated, in such a manner that its periphery is moved away from the supporting beam.

Since the discharge members are not attached to the pins but are loosely journalled on the same, the up-thrust of the worms $k$ is taken by the weight of the fertilizer substance resting on the discharge member, but it might occur that said up-thrust should increase in such a considerable degree that the weight of the fertilizers and of the discharge member itself would not be able to take it up and, therefore, there should be some other member to prevent the discharge member from being elevated to any considerable degree, and said member is simply the bottom of the box being arranged in rather close approximation to the discharge member.

From this it would appear that, if the box is caused to sag, it would very easily occur that the box should pinch the discharge member against the pin so that the discharge member cannot rotate. Therefore, it is important to prevent the box from sagging and to this end the beam supporting the pins is used as a tie-rod between the end walls of the box.

Furthermore, the presence of the bolts $p$ interlocking the beam and the bottom of the box is important in combination with the loosely journalled discharge members for the reason that, if the beam should sag, the discharge members would be removed from the bottom of the box and then nothing would prevent them from being elevated and removed from the top end of the pins. Therefore, the connection between the bottom of the box and the beam should be a rather rigid one as secured by way of the bolts.

Having now particularly described and ascertained the nature of my invention and in what manner the same is to be performed I declare that what I claim is:

1. A machine for spreading artificial fertilizers, comprising a frame, two wheels mounted on said frame and adapted to support the same, a box mounted on the frame and adapted to receive the fertilizer substance, said box having a number of apertures in the bottom thereof, a horizontal beam supported on said frame and extending below all of said apertures, a number of vertical pins adjustably mounted on said beam, each below one of said apertures, a number of disc-shaped discharge members each being loosely journalled on the upper end of one of said pins, means intercoupling said wheels and said discharge members so as to rotate the latter about the axis of said pins when said wheels are rotated, and means to adjust the position of each of said pins relatively to said beam so as to allow the pins to be lowered separately relatively to the discharge members.

2. A machine for spreading artificial fertilizers, comprising a frame, two wheels mounted on said frame and adapted to support the same, a box mounted on the frame and adapted to receive the fertilizer substance, said box having a number of apertures in the bottom thereof, a horizontal beam supported on said frame and extending below all of said apertures, a number of vertical pins each being adjustably mounted on said beam below one of said apertures so as to be rotated about its own axis, means for rigidly securing each of said pins separately to said beam to allow said pins to be separately released from the beam and lowered relatively to same, a number of disc-shaped discharge members each being loosely journalled on the upper end of one of said pins so as to be released from the pin when the latter is lowered, and means intercoupling said wheels and said discharge members so as to rotate the latter when said wheels are rotated.

3. A machine for spreading artificial fertilizers, comprising a frame, two wheels mounted on said frame and adapted to support the same, a box mounted on the frame and adapted to receive the fertilizer substance, said box having a number of apertures in the bottom thereof, a horizontal beam supported on said frame and extending below all of said apertures, a number of vertical pins each being adjustably mounted on said beam below one of said apertures so as to be rotated about its own axis, a tranversely disposed arm on each of said pins, an interlocking member mounted on the frame and adjacent the arm of each of said pins and adapted to interlock the pins in an elevated position when the pins are rotated to occupy positions in which said arms engage the adjacent interlocking member, a number of disc-shaped discharge members each being loosely journalled on the upper end of one of said pins so as to be released from the pin when the latter is lowered, and means intercoupling said wheels and said discharge members so as to rotate the latter when said wheels are rotated.

4. A machine for spreading artificial fertilizers, comprising a frame, two wheels mounted on said frame and adapted to support the same, a box mounted on the frame and adapted to receive the fertilizer substance, said box having a number of apertures in the bottom of said box, a horizontal beam supported on said frame and extending below all of said apertures, a number of vertical pins each being adjustably mounted on said beam below one of said apertures so as to be rotated about its own axis, a transversely disposed arm on each of said pins, a hook mounted on the frame and adjacent the arm of each of said pins and adapted to interlock the pins in an elevated position when the pins are rotated to occupy positions in which said arms engage the adjacent hook, a number of disc-shaped discharge members each being loosely journalled on the upper end of one of said pins so as to be released from the pin when the latter is lowered, and means intercoupling said wheels and said discharge members so as to rotate the latter when said wheels are rotated.

5. A machine for spreading artificial fertilizers, comprising a frame, two wheels mounted on said frame and adapted to support the same, a box mounted on the frame and adapted to receive the fertilizer substance, said box having a number of apertures in the bottom thereof, a horizontal beam supported on said frame and extending below all of said apertures, a number of vertical pins each being adjustably mounted on said beam below one of said apertures so as to be rotated about its own axis, a transversely disposed arm on each of said pins, a resilient hook mounted on the frame and adjacent the arm of each of said pins and adapted to interlock the pins in an elevated position when the pins are rotated to occupy positions in which said arms engage the adjacent resilient hook, a number of disc-shaped discharge members each being loosely journalled on the upper end of one of said pins so as to be released from the pin when the latter is lowered, and means intercoupling said wheels and said discharge members so as to rotate the latter when said wheels are rotated.

6. A machine for spreading artificial fertilizers, comprising a frame, two wheels mounted on said frame and adapted to support the same, a box mounted on the frame and adapted to receive the fertilizer substance, said box having a number of apertures in the bottom thereof, two end walls on said box, a horizontal beam extending between said two walls below all of said apertures so as to form a rigid connection between said two walls, a number of vertical pins adjustably mounted on said beam each below one of said apertures, a number of disc-shaped discharge members each being loosely journalled on the upper end of one of said pins, means intercoupling said wheels and said discharge members so as to rotate the latter about the axis of said pins when said wheels are rotated, and means to adjust the position of each of said pins relatively to said beam so as to allow the pins to be lowered seprately relatively to the discharge members.

7. A machine for spreading artificial fertilizers, comprising a frame, two wheels mounted on said frame and adapted to support the same, a box mounted on the frame and adapted to receive the fertilizer substance, said box having a number of apertures in the bottom thereof, two end walls on said box, a horizontal beam extending between said two walls below all of said apertures so as to form a rigid connection between said two walls, a number of vertical pins adjustably mounted on said beam each below one of said apertures, a number of disc-shaped discharge members each being loosely journalled on the upper end of one of said pins, means intercoupling said wheels and said discharge members so as to rotate the latter about the axis of said pins when said wheels are rotated, means to adjust the position of each of said pins relatively to said beam so as to allow the pins to be lowered separately relatively to the discharge members, and a number of vertical bolts interconnecting said beam and the bottom of said box in the intervals between the adjacent discharge members.

SVEND CHRISTIAN EMIL SCHRØDER.